(12) United States Patent
Wesselink et al.

(10) Patent No.: US 9,925,997 B2
(45) Date of Patent: Mar. 27, 2018

(54) METHOD FOR REDUCING THE OPERATIONAL WEIGHT OF A MEANS OF TRANSPORTATION

(71) Applicant: Airbus Operations GmbH, Hamburg (DE)

(72) Inventors: Christian Wesselink, Hamburg (DE); Frank Leuenberger, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 845 days.

(21) Appl. No.: 14/327,635

(22) Filed: Jul. 10, 2014

(65) Prior Publication Data

US 2015/0019274 A1 Jan. 15, 2015

(30) Foreign Application Priority Data

Jul. 10, 2013 (EP) .................................... 13175947

(51) Int. Cl.
| | |
|---|---|
| *B62B 3/00* | (2006.01) |
| *G06Q 10/02* | (2012.01) |
| *G06Q 10/08* | (2012.01) |
| *G06Q 30/06* | (2012.01) |
| *G06Q 50/28* | (2012.01) |

(52) U.S. Cl.
CPC ............... *B62B 3/00* (2013.01); *G06Q 10/02* (2013.01); *G06Q 10/08* (2013.01); *G06Q 30/0633* (2013.01); *B62B 2203/60* (2013.01); *G06Q 50/28* (2013.01)

(58) Field of Classification Search
USPC ............................................................ 705/5
See application file for complete search history.

(56) References Cited

U.S. PATENT DOCUMENTS

| | | | | |
|---|---|---|---|---|
| 6,095,410 A | * | 8/2000 | Andersen ............. | G06Q 20/343 235/380 |
| 7,343,157 B1 | * | 3/2008 | Mitchell ............ | H04B 7/18506 455/11.1 |
| 2007/0222599 A1 | * | 9/2007 | Coveley .............. | A61L 35/1113 340/572.4 |
| 2010/0224727 A1 | * | 9/2010 | Bauer ................ | B64D 11/0015 244/118.5 |

(Continued)

FOREIGN PATENT DOCUMENTS

| | | |
|---|---|---|
| DE | 102006026078 A1 | 12/2007 |
| WO | 2004028301 A1 | 4/2004 |
| WO | 2009005354 A1 | 1/2009 |

OTHER PUBLICATIONS

"Pushing and pulling carts and two-wheeled hand trucks"; Myung-Chul Jung et. al.; International Journal of Industrial Ergonomics 35 (2005) 79-89; Published Oct. 8, 2004 (Year: 2004).*

(Continued)

*Primary Examiner* — Kevin H Flynn
*Assistant Examiner* — Emmett K. Walsh
(74) *Attorney, Agent, or Firm* — Lorenz & Kopf, LLP

(57) ABSTRACT

A method for reducing the operational weight of a means of transportation is provided. The method includes: providing a list of possible food selections to passengers of the means of transportation before the journey; collecting food selections of passengers before the journey; and supplying the means of transportation with food based on the food selection of the passengers.

12 Claims, 2 Drawing Sheets

(56) References Cited

U.S. PATENT DOCUMENTS

| | | | | |
|---|---|---|---|---|
| 2013/0211977 A1* | 8/2013 | Lyon | ................. | G06Q 10/0875 705/29 |
| 2014/0313751 A1* | 10/2014 | Abel | ..................... | B64D 11/00 362/464 |

OTHER PUBLICATIONS

European Patent Office, Extended European Search Report for European Patent Application No. 13175947.4, dated Nov. 20, 2013.
European Patent Office, Extended European Search Report for European Patent Application No. 13175947.4, dated Apr. 3, 2017.

* cited by examiner

METHOD FOR REDUCING THE OPERATIONAL WEIGHT OF A MEANS OF TRANSPORTATION

CROSS-REFERENCE TO RELATED APPLICATION

This application claims priority to European Patent Application No. 13 175 947.4, filed Jul. 10, 2013, which is incorporated herein by reference in its entirety.

TECHNICAL FIELD

The technical field relates to a method for reducing the operational weight of a means of transportation, a logistic system, a transport and delivery container and an aircraft.

BACKGROUND

In an aircraft, catering for passengers is delivered with a galley trolley to the individual rows of seats. Usually, the trolley is loaded with various meals and beverages according to statistical principles and with a secure surplus in order to avoid bottlenecks for some products (for example sweet or salty snacks, meat dish or vegetarian meal, wine or cola . . . ). Furthermore, the passenger's selection of a product is determined only during the flight phase by a flight attendant.

This type of supply ("catering") using transport and delivery containers is also used in other means of transportation, such as trains.

Before a flight it is usually not known which passenger will choose which snacks, meal or beverage during the flight. The airline must therefore make an estimate, which may be based on experience and which may result in reserves of meals and beverages. These food reserves add weight to the aircraft.

Trolleys used in passenger airplanes usually have standard dimensions. For example, detailed specifications of trolleys of type ATLAS and KSSU may be found in WO 2004/028301 A1.

In addition, other objects, desirable features and characteristics will become apparent from the subsequent summary and detailed description, and the appended claims, taken in conjunction with the accompanying drawings and this background.

SUMMARY

Thus, with increasing pre-knowledge regarding the culinary preferences of each passenger, the food supply may be planned more efficiently. The food reserves may be reduced or even eliminated.

Another advantage may be that with increasing knowledge of the food selection of each passenger, flight attendants may distribute food according to the already made selection of a passenger without asking the passenger. This may reduce a permanent and repeated questioning in a noisy environment and may speed up the delivery of food.

Accordingly to various teachings, the present disclosure reduces the load weight or operational weight of a means of transportation. The various teachings of the present disclosure also provides an increase in the comfort of passengers, reduces stress for personnel and/or accelerates delivery of meals and beverages in a means of transportation.

In one embodiment, provided is a method for reducing the operational weight of a means of transportation. The operational weight of the means of transportation may be the weight of the (empty) means of transportation and the weight of the load of the means of transportation (which may comprise fuel, supplies and persons).

The means of transportation may be a ship, a train or an aircraft, for example a passenger aircraft.

According to an example, the method comprises: providing a list of possible food selections to passengers of the means of transportation before the journey (or flight in the case of an aircraft); collecting food selections (or food choices) of passengers before the journey; and supplying the means of transportation with food based on the food selection of the passengers.

Passenger-specific catering needs may be collected of all passengers before the journey and the means of transportation may be loaded with food accordingly. It has to be understood that the term "food" may comprise meals, snacks and beverages.

Besides the reduction of weight, the preselection of meals and beverages of a passenger before the flight may give the opportunity to adapt the individual flight price according to his selection. This may mean that a passenger may reduce the price of a ticket by, for example, waiving a snack.

Additionally, such a preselection offers a passenger the opportunity to order meals according to his/hers needs for undisturbed time periods during the journey/trip. For example, during a night flight, it is not uncommon that a meal is served at 4 o'clock in the morning. By waiving this meal, with a corresponding automatic information to the flight attendants during the 4 o'clock catering, the passenger may have an undisturbed sleep by being passed over during this catering run.

According to an example, the method further comprises: supplying a transport and delivery container with food based on the food selection of passengers to be served with the transport and delivery container. A list of food selections of passengers may be compiled and a transport and delivery container may be supplied with only the meals and beverages already ordered by the passengers. In such a way, the serving of passengers may be accelerated.

A transport and delivery container may be a trolley or galley trolley. The transport and delivery container may have standard dimensions of a trolley. For example, the transport and delivery container may be an ATLAS standard trolley or a KSSU standard trolley.

According to an example, the method further comprises: providing a list with food selections of passengers to personnel of the means of transportation on a transport and delivery container; and serving food based on the provided list. The transport and delivery container may be adapted for displaying the list. For example, the transport and delivery container may comprise or may be equipped with an electronic display for displaying the list, which may integrated into the transport and delivery container and/or fixed to the transport and delivery container. The display may also be attachable to the transport and delivery container and/or portable. This list may be loaded into the display before the journey or when the transport and delivery container is supplied with food, for example before or during the journey. Such a transport and delivery container may be called "smart transport and delivery container" or "smart trolley", since it is adapted for providing information about the food needs of passengers.

According to an example, the list of possible food selections is provided during a booking of a ticket for the journey and/or the food selections are collected during a booking of the ticket. For example, the booking may be an online booking of the ticket. The food selections collected during the booking may be stored in a (central) database and a specific list of food selections for a specific means of transportation may be requested from the database before the journey. This list on the one hand may be used for supplying the means of transportation (and may be provided to a supply facility of the means of transportation) and/or on the other hand may be stored in a transport and delivery container to be used during the journey for serving the food according to the food selections of the passengers.

According to an example, the method further comprises: automatically identifying a passenger, a seat and/or seat row in the means of transportation with a transport and delivery container; displaying the food selection of the passenger (in the identified seat) to personnel of the means of transportation. The transport and delivery container, which has been supplied or loaded with food according to a predefined list based on food selections of passengers, may also be adapted for detecting a seat row next to it and to display the food selections of passengers sitting in the seat row. For example, the transport and delivery container may comprise an according sensor for identifying a passenger, a seat and/or a seat row. In response to the identification of the passenger seat and/or seat row, the corresponding food selection may be displayed on a display of the transport and delivery container.

The various teachings of the present disclosure also provide a logistic system for loading a means of transportation. The logistic system comprises a computer system for providing a list of possible food selections to passengers of the means of transportation before the journey and for collecting food selections of passengers before the flight. For example, the computer system may comprise servers for providing internet pages and/or online services to computers of the passengers. The computer system may comprise a database for storing food selections of a passenger associated with a booked journey and with a seat place of the passenger.

According to an example, the logistic system comprises a supply facility of the means of transportation adapted for receiving the food selection and for supplying the means of transportation with food according to the food selection. The supply facility, for example a stock/warehouse in an airport or a caterer, may receive a list of food selections for a specific means of transportation that has to be supplied or loaded. For example, the supply facility may request this list from the central database.

According to an example, the logistic system further comprises a transport and delivery container adapted for displaying the food selections to personnel of the means of transportation. The transport and delivery container may receive a list with food selections from the central database before the journey. The list may comprise the seat and the food selection of each passenger travelling with the means of transportation. This list also may be used for loading or supplying the transport and delivery container with food.

The various teachings of the present disclosure provides a transport and delivery container. In general, a transport and delivery container may be a vehicle that is adapted for being moved through the means of transportation (for example on rollers). Usually, it has a substantially rectangular form with dimensions such that it fits through an aisle of the means of transportation.

According to an example, the transport and delivery container comprises a display for displaying a list with food selections of passengers to be served with the transport and delivery container; and at least one container for storing food. For example, the (electronic) display may be mounted directly to the container. The display may be part of a tablet PC. The display may show a representation of a selected passenger, selected seat and/or a selected seat row.

According to an example, the transport and delivery container further comprises an integrated holder for attaching a detachable display to the transport and delivery container. For example, the display (or a tablet PC) may be attached to the holder before the serving of the food.

According to an example, the display is integrated into the transport and delivery container. For example, the display may be folded out in operation.

According to an example, the transport and delivery container further comprises a sensor for identifying a seat and/or a seat row next to the transport and delivery container. The transport and delivery container may comprise a sensor or an automatic detection of the seat and/or row, next to (besides) which the transport and delivery container is located. The information of the sensor may be used to automatically display the current row next to the transport and delivery container together with associated food selection of the passengers in this row. Alternatively, it is possible that a row indicator on the display is manually set to a specific row.

As an example, the sensor may be adapted for performing a distance measurement, e.g. with a laser.

According to an example, the identification is based on signals of a wireless communication network of the means of transportation and/or of signals of a mobile phone of the passenger. For example, the sensor may be a wireless receiver that is also used for receiving data from a wireless communication network of the means of transportation.

In an example, the identification for a seat and/or a seat row is based on signals of a wireless communication network of the means of transportation, wherein a relative positioning of the galley trolley to a cabin layout is determined by location of the galley trolley, wherein the galley trolley sends active or passive identification signals to the wireless communication network.

In another example, provided in addition or alternatively, the identification of a seat and/or a seat row is based on signals of a mobile phone of the passenger, wherein a relative positioning of the passenger is determined by detecting radio signals of his personal mobile phone.

A relative positioning of the transport and delivery container to cabin layout may be determined by location of the transport and delivery container with the aid of an on-board radio network, for example an on-board internal wireless network. In this case, the transport and delivery container may send active or passive identification signals to the on-board wireless network.

Alternatively or additionally, a relative positioning of the passenger may be determined by detecting radio signals via his personal mobile phone. For example, a customized smartphone application loaded into the mobile phone may offer these signals.

According to an example, the identification is based on a radio chip (for example RFID chip) integrated into the seat, the seat row and/or a ticket of the passenger. A relative positioning of the passenger may be determined by a radio chip integrated in the boarding card of the passenger. With such a chip, an active or passive identification signal may be sent to the transport and delivery container.

The various teachings of the present disclosure also provides an aircraft comprising such a transport and delivery container, for example a passenger airplane.

Summarized, the various teachings of the present disclosure may relate to three aspects: The ability of a passenger to make a choice with respect to food and/or beverage before the flight, the ability of an airline to operate a smart catering, in which the load weight of the aircraft may be reduced, and a seat place-related presentation of a passenger selection on the smart transport and delivery container for flight attendants.

With the method, the system and/or the transport and delivery container, the operational weight of a commercial aircraft may be reduced by reducing the excess weight of catering goods for its passengers. This may be achieved by firstly enabling, and encouraging, passengers to select their meals and beverages before flight. Secondly, these food selections may be communicated to a catering supplier running a supply facility, who subsequently prepares and provisions the selected quantity of meals and beverages for the flight. Thirdly, during the flight, the meals and beverages may be distributed exactly according to the individual passenger's pre-flight selection. To enable such a level of customization during flight, a standard trolley may be equipped with an electronic display that presents/displays the food selection according to the passenger and/or according to the seat number.

The weight reduction may be achieved through a significant reduction of surplus meals and beverages (contingencies) that otherwise usually need to be carried along today to consider the logistical uncertainties with respect to free choice offers to passengers during flight. If an airline has knowledge about passengers' preferences for a flight, it may plan the catering accordingly.

With the method, the system and/or the transport and delivery container, the comfort and efficiency of the catering phase during flight also may be improved:

The catering phase may be challenging to both cabin crew and passengers alike. The cabin crew may have to continuously repeat the list of choices regarding meals and beverages to passengers, and passengers are still not always able to hear this repeated presentation of choices due to the high background noise of the aircraft, so they may either become frustrated with the situation, or they may become afraid to ask again. As this happens, time is lost, and passengers further back consequently need to wait longer until they are served.

If a cabin crew has knowledge of a passenger's choice in relationship to his seat number in the aircraft, communication may be reduced to simple exchanges such as "Here you are" and "Thank you". It may be not a reduction of dialogue altogether, but a reduction of unnecessary or unpleasant dialogue, that may be achieved. This may speed up the catering process automatically, even without any need to be rushed. Passengers may be happy to receive what they had already expected, and the cabin crew may be happy to complete the catering phase more quickly and pleasantly.

With the method, the system and/or the transport and delivery container, more customized flight fares may be enabled. Passengers may reduce the base price of their flight tickets by deliberately rejecting a meal.

Furthermore, especially in the case of red-eye flights (flights through the night), passengers may feel disturbed in their sleep by the catering phase, which may take place for example at 4 o'clock in the morning. By deliberately omitting this meal, a passenger may gain sleep in addition to reducing the base ticket price.

It should be noted that in above examples, passengers may perform reductive measures to their ticket fares. However, the other way round, airlines may offer just a base ticket price that excludes meals and certain drinks, and passengers may add food and beverage options to their tickets according to their preferences.

It has to be understood that features of the method as described in the above and in the following may be features of the logistic system and/or the transport and delivery container as described in the above and in the following and vice versa.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
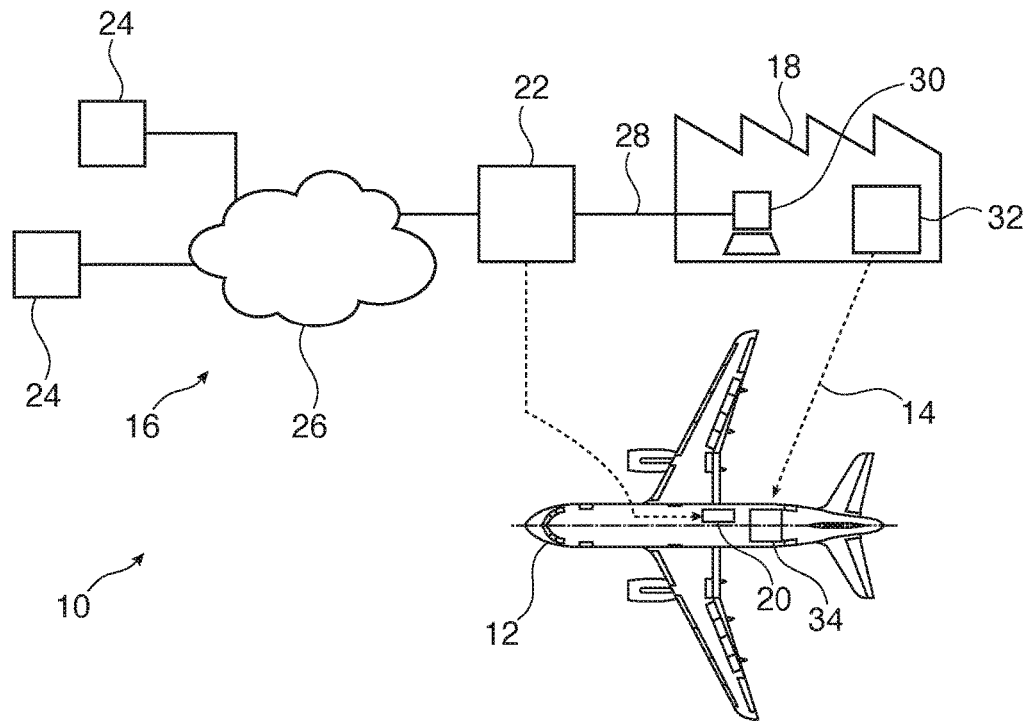
FIG. 1 schematically shows an example of a logistic system.

FIG. 1 schematically shows a logistic system 10 for supplying a means of transportation in the form of an airplane 12 with food 14. The logistic system 10 comprises a computer system 16 for collecting information of food preferences of passengers, a supply facility 18 for storing and supplying food 14 and a transport and delivery container 20 for serving the food 14 to the passengers in the airplane 12. The transport and delivery container 20 may be a standard trolley.

The computer system 16 comprises a central server/database 22 for providing internet pages and online booking services to devices 24 of passengers via the internet 26.

A list 28 with ordered food may be requested from the server/database 22 via a computer 30. Based on the list 28 food in a stock 32 may be collected and may be supplied to a galley 34 of the airplane 12 or directly to the transport and delivery container 20.

Figure 2:
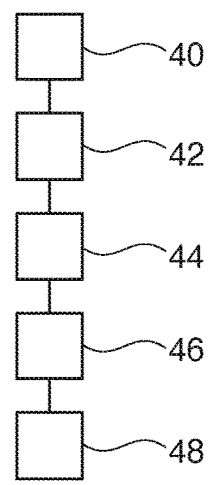
FIG. 2 shows an example of a flow diagram for a method for reducing the operational weight of a means of transportation.

FIG. 2 shows a method for reducing the operational weight of the aircraft 12.

At 40, before the flight, the computer system 16 provides a list of possible food selections to passengers of the means of transportation 12 before the journey and collects food selections of passengers before the journey. For example, a passenger may book a flight and during the booking, the server/database 22 may provide the passenger with a list of possible food served during the flight and the passenger may indicate which kind of food he/she prefers. The passenger also may order a further meal or may waive a meal. The selection of the passenger may then be stored in the database.

At 42, the means of transportation 12 is supplied with food 14 based on the food selection of the passengers. Before the flight, the information about the food selections of the passengers are provided to the supply facility 18. For example, personnel of the supply facility may request a list 28 with ordered food from the server/database 22 via a computer 30 in the supply facility 18 and may collect the food in a stock 32, which is then transported to the aircraft 12 and stored in the galley 34 or directly in a transport and delivery container 20.

At 44, a list 34 with food selections and seat places of passengers is provided to the aircraft 12, in particular to the transport and delivery container 20. For example, a flight attendant may download the list 34 from the server/database 22 onto a tablet computer before the flight, which then may be attached to the transport and delivery container 20. Alternatively, a computer system of the aircraft 12 may connect to the computer system 10, may download the list 34 and may store the list in a "smart" transport and delivery container 20, which comprises means for processing and displaying the list 34.

At 44, the transport and delivery container 20 is supplied or loaded with food 14 based on the food selection of passengers to be served with the transport and delivery container 20. For example, a flight attendant of the aircraft 12 may collect needed food from storages of the galley 34 according to the list 34.

Figure 3:
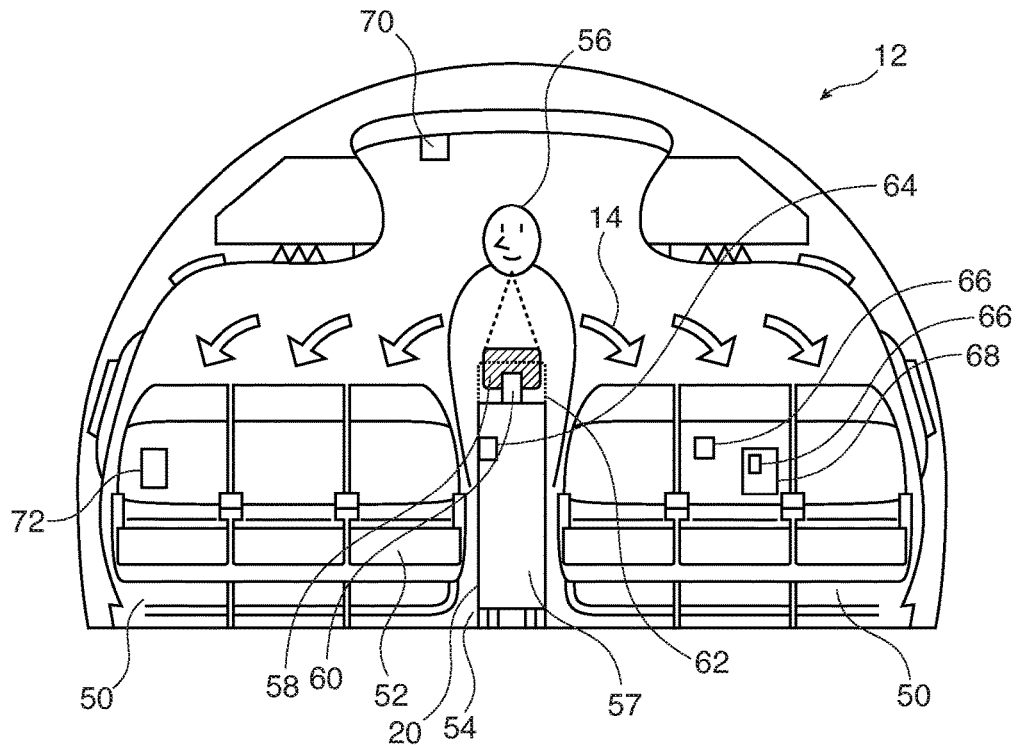
FIG. 3 schematically shows an example of an interior of a means of transportation.

In FIG. 3, the interior of the aircraft 12 during the serving of a meal is shown. The aircraft comprises seat rows 50, each of which comprises six seats 52 with an aisle 54 in the middle of them. A flight attendant 56 pushes the transport and delivery container 20 through the aisle 54, while distributing food 14 (meals, snacks and beverages) to the passengers. The transport and delivery container 20 comprises a container part 57 with wheels and a display 58 attached via a stand or holder 60 to the container part 57, which is located in the visual field of the flight attendant. As indicated in FIG. 3, the place in front of the display 58 may be used for putting a further catering container 62 on the transport and delivery container 20.

Turning back to FIG. 2, at 46, the transport and delivery container 20 automatically identifies the seat 52 and/or the seat row 50 next to it. The transport and delivery container 20 may comprise a sensor 64, for example a radio receiver, which may locate the transport and delivery container 20 relative to the interior of the aircraft 12. Such a location may be done via an internal wireless communication network 70 of the aircraft 12. The sensor 64 may identify a radio chip 66 integrated into the seat row 50 or each seat 52. It is also possible that the sensor 64 identifies a radio chip 66 integrated into a boarding card 68 of a passenger. A further possibility is the location of a mobile phone 72 of a passenger via the sensor 64.

At 48, based on the identified seats/rows, the display 58 provides the food selections of the passenger(s) sitting in the seat/row to the flight attendant 56, who then serves the food 14 based on the provided list.

Figure 4:
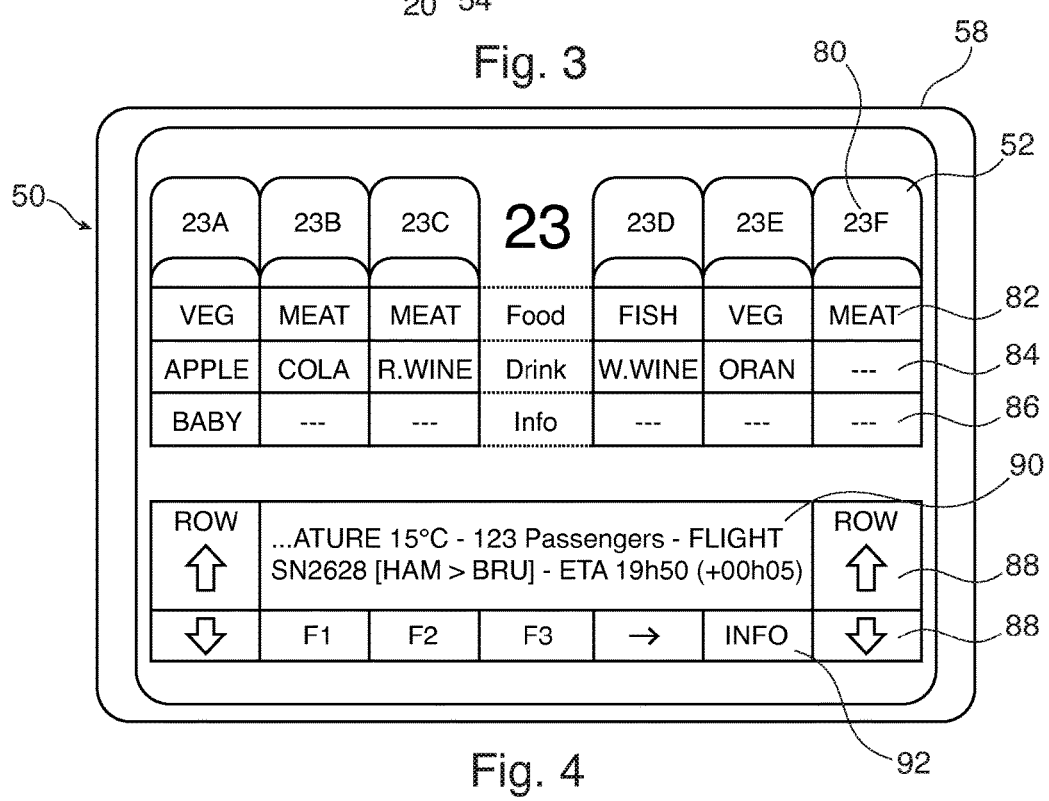
FIG. 4 schematically shows an example of a display of a transport and delivery container.

FIG. 4 schematically shows a possible layout of the display 58. Based on the row 50 currently served, the display 58 contains a visualization of the row 50 and the seats 52 with the corresponding seat numbers 80. Below each visualization of the seats, there are fields 82, 84, 86 for the food selection, comprising a field 82 for the meal selection, a field 84 for the beverage selection and a field 86 for further information. The fields 82, 84, 86 may be colored dependent on the selected food for a faster recognition of the food selection of the passenger.

The display may comprise (touchable) buttons 88 for manually selecting the row 50 to be displayed and may comprise fields 90 with further relevant information and further buttons 92.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for reducing the operational weight of a means of transportation, the method comprising:
    displaying, on an electronic display, a list of possible food selections to passengers of the means of transportation before a journey wherein the possible food selections are to be served with a transport and delivery container;
    collecting food selections of the passengers before the journey;
    supplying the transport and delivery container with food based on the food selections of the passengers;
    identifying, with a sensor of the transport and delivery container, at least one of a seat and a seat row of the means of transportation next to the transport and delivery container when the transport and delivery container is onboard the means of transportation;
    wherein the identifying is based on signals of a wireless communication network of the means of transportation, and is further based on radio signals of a mobile phone of a passenger of the passengers, and wherein a relative positioning of the passenger is determined by detecting the radio signals of the mobile phone of the passenger;
    wherein a relative positioning of the transport and delivery container to a cabin layout is determined by the sensor of the transport and delivery container and the determination of the relative positioning of the transport and delivery container to the cabin layout is based on a location of the transport and delivery container; and
    wherein the sensor of the transport and delivery container or a radio of the transport and delivery container sends active or passive identification signals to the wireless communication network.

2. The method of claim 1, further comprising:
    providing a list with the food selections of the passengers to personnel of the means of transportation on the transport and delivery container; and
    serving the food based on the provided list.

3. The method of claim 1, wherein the list of possible food selections is provided during a booking of a ticket for the journey.

4. The method of claim 3, wherein the food selections of the passengers are collected during the booking of the ticket.

5. The method of claim 1, further comprising:
    displaying the food selection of a passenger based on the identified at least one of the seat and the seat row of the means of transportation to personnel of the means of transportation.

6. The method of claim 1, further comprising:
automatically identifying a passenger of the passengers by the transport and delivery container; and
displaying the food selection of the passenger based on the identified passenger.

7. A transport and delivery container, comprising:
a display that displays a list with food selections of passengers to be served with the transport and delivery container;
at least one container for storing food; and
a sensor for identifying at least one of a seat and a seat row of a means of transportation next to the transport and delivery container when the transport and delivery container is onboard the means of transportation;
wherein the identifying is based on signals of a wireless communication network of the means of transportation, and is further based on radio signals of a mobile phone of a passenger of the passengers, and wherein a relative positioning of the passenger is determined by detecting the radio signals of the mobile phone of the passenger;
wherein a relative positioning of the transport and delivery container to a cabin layout is determined by the sensor, and the determination of the relative positioning of the transport and delivery container to the cabin layout is based on a location of the transport and delivery container; and
wherein the sensor or a radio of the transport and delivery container sends active or passive identification signals to the wireless communication network.

8. The transport and delivery container of claim 7, further comprising:
an integrated holder that attaches the display to the transport and delivery container.

9. The transport and delivery container of claim 7, wherein the display is integrated into the transport and delivery container.

10. The transport and delivery container of claim 7, wherein the identifying is based on a radio chip integrated into at least one of the seat, the seat row and a ticket of a passenger of the passengers.

11. An aircraft, comprising:
a transport and delivery container including a display that displays a list with food selections of passengers to be served with the transport and delivery container;
at least one container for storing food;
an integrated holder that attaches the display to the transport and delivery container; and
a sensor for identifying at least one of a seat and a seat row of a means of transportation next to the transport and delivery container when the transport and delivery container is onboard the means of transportation;
wherein the identifying is based on signals of a wireless communication network of the means of transportation and is further based on radio signals of a mobile phone of a passenger of the passengers;
wherein a relative positioning of the transport and delivery container to a cabin layout is determined by the sensor and the determination of the relative positioning of the transport and delivery container to the cabin layout is based on a location of the transport and delivery container; and
wherein the sensor or a radio of the transport and delivery container sends active or passive identification signals to the wireless communication network.

12. The aircraft of claim 11, wherein the identifying is based on a radio chip integrated into at least one of a seat, a seat row and a ticket of a passenger.

* * * * *